(12) United States Patent
Iso et al.

(10) Patent No.: US 6,946,166 B2
(45) Date of Patent: Sep. 20, 2005

(54) MAGNETIC RECORDING MEDIUM, A METHOD OF MANUFACTURING THE SAME, AND A MAGNETIC STORAGE DEVICE USING THE MAGNETIC RECORDING MEDIUM

(75) Inventors: Akira Iso, Nagano (JP); Takahiro Shimizu, Nagano (JP); Naoki Takizawa, Nagano (JP)

(73) Assignee: Fuji Electric Co., Ltd. (JP)

( * ) Notice: Subject to any disclaimer, the term of this patent is extended or adjusted under 35 U.S.C. 154(b) by 78 days.

(21) Appl. No.: 10/318,280

(22) Filed: Dec. 12, 2002

(65) Prior Publication Data

US 2003/0134155 A1 Jul. 17, 2003

(30) Foreign Application Priority Data

Dec. 13, 2001 (JP) ........................................ 2001-380403

(51) Int. Cl.7 ................................................ G11B 5/84
(52) U.S. Cl. ...................... 427/536; 427/539; 427/558; 427/129; 427/131
(58) Field of Search ................................. 427/536, 539, 427/558, 129, 131

(56) References Cited

U.S. PATENT DOCUMENTS

| 4,707,380 A | * 11/1987 | Hashimoto et al. ......... 427/502 |
| 6,139,936 A | * 10/2000 | Weiss .......................... 428/141 |
| 6,419,995 B1 | * 7/2002 | Kuckertz et al. ............ 427/536 |

FOREIGN PATENT DOCUMENTS

| JP | 62080826 | * 4/1987 |
| JP | 62132218 | * 6/1987 |
| JP | 01037715 | * 2/1989 |
| JP | 01076525 | * 3/1989 |
| JP | 03207012 | * 9/1991 |
| JP | 3-207012 | 9/1991 |
| JP | 405189742 | * 7/1993 |
| JP | 2000-63548 | 2/2000 |

* cited by examiner

Primary Examiner—Stevan A. Resan
(74) Attorney, Agent, or Firm—Rossi, Kimms & McDowell

(57) ABSTRACT

A magnetic recording medium according to the invention includes a nonmagnetic substrate made of a polymer resin, the nonmagnetic substrate having been treated to improve an adhesion characteristic thereof; an adhesive layer on the nonmagnetic substrate, a nonmagnetic undercoating layer on the an adhesive layer; a magnetic layer above the nonmagnetic undercoating layer; a protection layer above the magnetic layer; and a liquid lubricant layer on the protection layer. A method of manufacturing the magnetic recording medium described above includes the steps of: treating a nonmagnetic substrate to improve an adhesion characteristic thereof; forming an adhesive layer on the nonmagnetic substrate, the adhesion thereof having been improved; forming a nonmagnetic undercoating layer on the adhesive layer; forming a magnetic layer above the nonmagnetic undercoating layer; forming a protection layer above the magnetic layer; and forming a liquid lubricant layer on the protection layer. A magnetic storage device according to the invention mounts thereon the magnetic recording medium described above.

5 Claims, 1 Drawing Sheet

Figure 1:
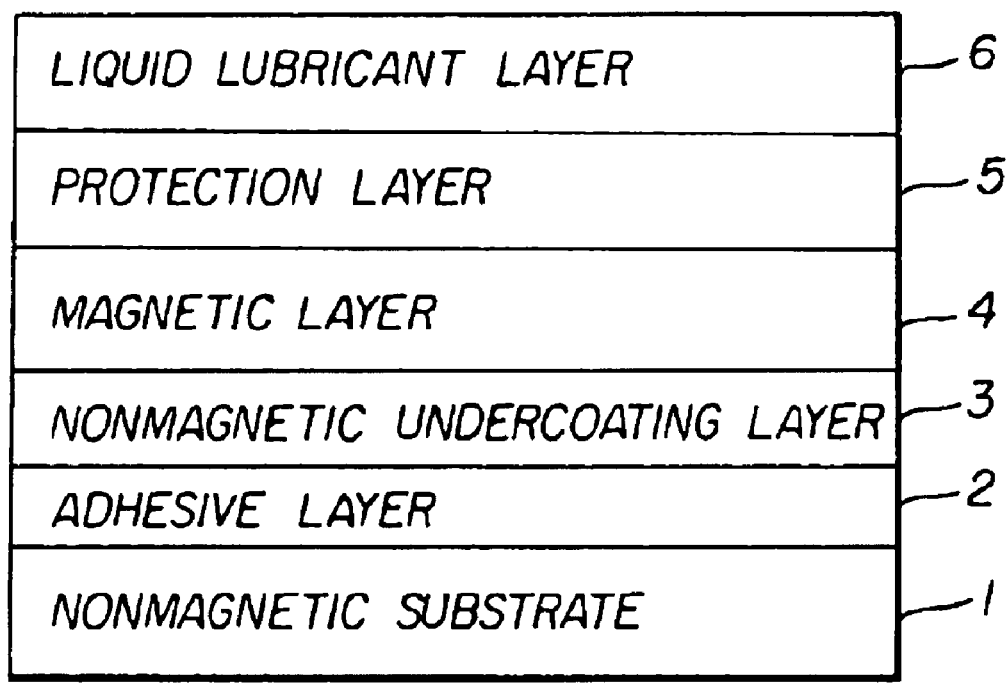

MAGNETIC RECORDING MEDIUM, A METHOD OF MANUFACTURING THE SAME, AND A MAGNETIC STORAGE DEVICE USING THE MAGNETIC RECORDING MEDIUM

BACKGROUND

The present invention relates to a magnetic recording medium mounted on an external storage device of a computer and such a magnetic storage device, a method of manufacturing the magnetic recording medium, and the magnetic storage device using the magnetic recording medium. Specifically, the present invention relates to a magnetic recording medium including a polymer resin substrate, the method of manufacturing such a magnetic recording medium, and the magnetic storage device using the magnetic recording medium described above.

Recently, magnetic recording media mounted on various magnetic storage apparatuses, such an external storage device of a computer, are expected to exhibit a higher recording density. In order to fully utilizing the realized higher recording density, it has been required for the magnetic head, which writes in and reads out data to and from the magnetic recording media, to facilitate lower-height floating characteristics. To realize a magnetic recording media exhibiting a high recording density and compatible with a low-floating-height magnetic head, various compositions and structures have been proposed for the magnetic layer of the magnetic recording media, various materials for the nonmagnetic undercoating layer and various materials for the nonmagnetic substrate. Although aluminum and glass are the main materials for the nonmagnetic substrate at present, a polymer resin substrate, a so-called plastic substrate, has been proposed recently for the nonmagnetic substrate.

In order to facilitate lower-height floating of the magnetic head so that the higher recording density realized in the magnetic recording media may be fully utilized, it is required for the magnetic recording media to be used reliably for a long time in severer environments. It is also required for the magnetic recording media for digital household appliances now under development to be used reliably for a long time in severer environments. The conditions, under which the magnetic recording media are used, extend from very cold −40° C. to very hot and humid 80° C. and 80% (in relative humidity). Some household appliance makers require that the magnetic recording media be working normally for five years under the conditions described above. Moreover, it is indispensable for the magnetic recording media for household appliances to be manufactured with low costs. The polymer resin substrate is very hopeful to meet the demands described above.

Although the polymer resin substrate is hopeful for the substrate of the magnetic recording media, film inflation (a kind of film cleavage) is caused in the magnetic recording media including the polymer resin substrate. For preventing the film inflation from causing, it has been proposed to irradiate plasma or an ultraviolet ray to the polymer resin substrate (cf. Japanese Unexamined Laid Open Patent Application S57-191830). Japanese Unexamined Laid Open Patent Application H03-207012 discloses a plasma activation method for the polymer resin substrates, which facilitates improving the durability of the polymer resin substrates without impairing the properties of the magnetic layer by selecting a material, which does not affect the properties of the magnetic layer, for the material of the electrode, from which plasma is discharged. A method proposed for preventing film inflation from causing deposits a carbon film, the B/A ratio thereof measured by the Raman spectroscopic analysis is high, on a substrate.

However, it has been revealed that the methods described above sometimes fail to prevent film inflation from causing depending on the layer structure and the film deposition conditions for providing magnetic recording media with a higher recording density.

In view of the foregoing, it would be desirable to provide a magnetic recording medium, which obviates the problems described above. It would further be desirable to provide a very durable magnetic recording medium, which exhibits a high recording density, includes a polymer resin substrate, and facilitates preventing film inflation from causing.

SUMMARY OF THE INVENTION

According to a first aspect of the invention, a magnetic recording medium is provided that includes: a nonmagnetic substrate made of a polymer resin, the nonmagnetic substrate having been treated to improve an adhesion characteristic thereof; a nonmagnetic undercoating layer above the nonmagnetic substrate; a magnetic layer above the nonmagnetic undercoating layer; a protection layer above the magnetic layer; a liquid lubricant layer on the protection layer; and an adhesive layer between the nonmagnetic substrate and the nonmagnetic undercoating layer.

According to a second aspect of the invention, a method of manufacturing a magnetic recording medium is provided that includes a nonmagnetic substrate made of a polymer resin; a nonmagnetic undercoating layer above the nonmagnetic substrate; a magnetic layer above the nonmagnetic undercoating layer; a protection layer above the magnetic layer; and a liquid lubricant layer on the protection layer, the method including the steps of: treating the surface of the nonmagnetic substrate to improve an adhesion characteristic thereof; forming an adhesive layer on the nonmagnetic substrate, the adhesion thereof having been improved; forming the nonmagnetic undercoating layer on the adhesive layer; forming the magnetic layer above the nonmagnetic undercoating layer; forming the protection layer above the magnetic layer; and forming the liquid lubricant layer on the protection layer.

Preferably, the adhesion of the nonmagnetic substrate is improved by plasma irradiation or by ultraviolet ray irradiation. Further, in a preferred application, a carbonyl group concentration in a surface of the nonmagnetic substrate measured by the X-ray photoelectron spectroscoic analysis is from 0.1 at. % to 30 at. % after the plasma irradiation or after the ultraviolet ray irradiation. The plasma irradiation preferably utilizes argon, oxygen, or a mixture of argon and oxygen for the plasma discharge gas. The ultraviolet ray irradiation is preferably conducted under the existence of nitrogen, oxygen, or a mixture of nitrogen and oxygen (including air).

Further, the adhesive layer preferably contains carbon. The B/A ratio of the adhesive layer containing carbon measured by the Raman spectroscopic analysis is preferably three or more. The adhesive layer containing carbon is also preferably formed by sputtering under the sputtering gas pressure of 5 mTorr or higher.

According to a third aspect of the invention, a magnetic storage device mounting thereon any of the magnetic recording media described above is provided.

BRIEF DESCRIPTION OF THE DRAWING FIGURE

The invention will be described in greater detail with reference to certain preferred embodiments thereof and the accompanying FIG. 1, which is a cross sectional view of a magnetic recording medium according to the invention.

DETAILED DESCRIPTION OF THE PREFERRED EMBODIMENTS

As described above, the magnetic recording medium according to the invention includes a nonmagnetic substrate made of a polymer resin, the nonmagnetic substrate having been treated to improve the adhesion thereof; a nonmagnetic undercoating layer above the nonmagnetic substrate; a magnetic layer above the nonmagnetic undercoating layer; a protection layer above the magnetic layer; a liquid lubricant layer on the protection layer; and an adhesive layer between the nonmagnetic substrate and the nonmagnetic undercoating layer.

The present inventors investigated the problems of conventional treatment methods. Although polymer resins are useful for the nonmagnetic substrate, film inflation is caused in the polymer resin substrate. Therefore, it is necessary to prevent film inflation from occurring. The present inventors have found that it is difficult for the conventional treatment methods to prevent film inflation from occurring depending on the layer structure and the film deposition conditions, especially when the magnetic recording medium is designed to obtain a high recording density. For example, when a TiW film or a Ru film for the undercoating layer is formed by sputtering under the sputtering gas pressure of 50 mTorr, film inflation is prevented from occurring by treating the surface of the polymer resin substrate by plasma or by forming a carbon film, wherein the B/A ratio thereof is 6 or more. However, when the sputtering gas pressure is 5 mTorr, film inflation is not prevented from occurring by the surface plasma treatment or by forming the carbon film exhibiting a B/A ratio of 6 or more.

The present inventors have investigated very durable magnetic recording media including a polymer resin substrate and meeting the demands for a higher recording density and methods of manufacturing the very durable magnetic recording media.

The present inventors have found that a very durable magnetic recording medium including a polymer resin substrate and meeting the demands for a higher recording density is obtained by treating the substrate surface to improve the adhesion thereof and by disposing an adhesive layer on the substrate.

FIG. 1 is a cross sectional view of a magnetic recording medium according to the invention. Referring now to FIG. 1, the magnetic recording medium according to the invention includes a nonmagnetic substrate 1 made of a polymer resin, an adhesive layer 2 on the nonmagnetic substrate 1, a nonmagnetic undercoating layer 3 on the adhesive layer 2, a magnetic layer 4 on the nonmagnetic undercoating layer 3, a protection layer 5 on the magnetic layer 4, and a liquid lubricant layer 6 on the protection layer 5. The magnetic recording medium according to the invention is characterized by the nonmagnetic substrate 1 made of a polymer resin and the adhesive layer 2 formed on the nonmagnetic substrate 1.

A polyolefin resin, a polycarbonate resin, a polyacrylate resin, a polyethylene resin, a polyether resin, a polystyrene resin, and such a resin are used for the polymer resin substrate. The polymer resin substrate is as thick as the substrates used in conventional magnetic recording media.

According to the invention, the surface of the polymer resin substrate is treated to improve the adhesion of the polymer resin substrate. Although plasma irradiation and ultraviolet (UV) ray irradiation are preferable for improving the adhesion of the polymer resin substrate, other treatment methods are employable as far as they are effective to improve the adhesion of the polymer resin substrate. According to the invention, an adhesive layer is formed on the polymer resin substrate, the surface thereof has been treated to improve the adhesion thereof. These two characteristic features according to the invention facilitate providing a very durable magnetic recording medium including a polymer resin substrate and meeting the demands for a higher recording density.

Helium, argon, nitrogen, oxygen and a mixture of these gases may be used for the plasma discharge gas for treating the polymer resin substrate. Among these gases, argon, oxygen, and a mixture of argon and oxygen are preferable for the discharge gas. The treatment by plasma irradiation is conducted in the conventional plasma discharging apparatus as described later in connection with the method of manufacturing the magnetic recording medium according to the invention.

The ultraviolet ray irradiation for treating the polymer resin substrate may be conducted under the existence of air, argon, nitrogen, oxygen or a mixture of nitrogen and oxygen. Preferably, the ultraviolet ray irradiation is conducted under the existence of nitrogen, oxygen, or a mixture of argon and oxygen (including air).

The existence of oxygen in the plasma irradiation treatment or in the ultraviolet ray irradiation treatment facilitates obtaining a high adhesion force, shortening the treatment time and suppressing the output of the plasma or the output of the ultraviolet ray at a low level.

It is preferable that the carbonyl group concentration in the surface of the polymer resin substrate measured by the X-ray photoelectron spectroscopic analysis is from 0.1 at. % to 30 at. % after the plasma irradiation treatment or after the ultraviolet ray irradiation treatment.

The adhesive layer is interposed to improve the adhesion between the polymer resin substrate and the metal layer (e.g. a nonmagnetic undercoating layer) above the polymer resin substrate. Therefore, the adhesive layer is made preferably of a material well adhesive to the polymer resin substrate and the metal layer above the polymer resin substrate. A silicon film, a carbon film, a silicon oxide film, and a film containing carbon may be used for the adhesive layer, although other materials may be also useful. The film containing carbon is preferably used for the adhesive layer, and a carbon film is used for the adhesive layer more preferably. The B/A ratio of the film containing carbon inclusive of a carbon film measured by the Raman spectroscopic analysis is 3 or more preferably. The B value is the peak intensity of the Raman spectrum including the fluorescent intensity. The A value is the peak intensity of the Raman spectrum, on which baseline correction is conducted. That is, the A value is the peak intensity of the Raman spectrum excluding the fluorescent intensity. As the B/A ratio is larger, that is the fluorescent intensity is stronger, the polymer content is higher usually.

When the film containing carbon is formed by sputtering, it is preferable to set the sputtering gas pressure at 5 mTorr or higher. When the film containing carbon is a carbon film, the B/A ratio thereof is preferably 3 or more, more preferably between 3 and 10, and most preferably 3. When the film containing carbon is a carbon film, the sputtering gas pressure is preferably 5 mTorr or more, more preferably from 5 mTorr to 50 mTorr, and most preferably 5 mTorr. When a carbon film is used for the adhesive layer, the carbon film is preferably from 0.5 nm to 10 nm in thickness, and more preferably from 1 nm to 2 nm in thickness.

Although it is preferable to meet the conditions described above, the practical conditions are selected considering the advantages and disadvantages of the plasma irradiation treatment or the ultraviolet ray irradiation treatment and the advantages and disadvantages of interposing the adhesive layer. The advantages and disadvantages are considered below.

The plasma irradiation treatment or the ultraviolet ray treatment produces carbonyl groups in the substrate surface, raises the surface energy of the substrate, and strengthens the adhesion. It is considered that film inflation is caused by aggregation of water. The film is inflated by the water aggregated on the boundary between the substrate and the film, or by the swelling of the degraded products of the resin for the substrate. The swelling of the degraded products is caused by the water, which has come between the substrate and the degraded products of the resin. The contact angle between the water and the substrate surface becomes low, that is the water hardly aggregates, due to the surface energy raised by the plasma irradiation treatment or by the ultraviolet ray irradiation treatment. Although film inflation is prevented from occurring by the plasma irradiation treatment or by the ultraviolet ray irradiation treatment, these treatments produce low-molecular weight components of the resin and decomposition products of the antioxidant contained in the resin as well as carbonyl groups. Since these products cause film inflation, it is necessary to select the conditions for the plasma irradiation treatment or for the ultraviolet ray irradiation treatment considering the surface conditions of the polymer resin substrate and the layer to be formed on or above the substrate. Therefore, the effects of the conventional surface treatment methods do not offset the costs thereof. Although the adhesion is improved by raising the plasma intensity or the ultraviolet ray intensity, the raised plasma intensity or the raised ultraviolet ray intensity causes more amounts of decomposition products. Since the decomposition products cause film inflation, it is not preferable to raise the plasma intensity or the ultraviolet ray intensity too much. When the plasma intensity or the ultraviolet ray intensity is low, sufficient adhesion is not obtained sometimes.

The magnetic recording medium according to the invention includes an adhesive layer. The adhesive layer bonds the polymer resin substrate and the metal layer above the substrate tightly and prevents film inflation from causing. When the B/A ratio of the adhesive layer containing carbon measured by the Raman spectroscopic analysis is not large enough, the adhesiveness between the polymer resin substrate and the adhesive layer is weak, causing film inflation. For increasing the B/A ratio, it is necessary to dope a large amount of hydrogen to the adhesive layer containing carbon. However, the hydrogen contained in the adhesive layer causes hydrocarbon, which further causes film inflation. When an adhesive layer is formed on the polymer resin substrate, it is necessary to adjust the property of the adhesive layer (e.g. the B/A ratio of the adhesive layer containing carbon) and the thickness of the adhesive layer considering the surface conditions of the polymer resin substrate and the layer to be formed on the adhesive layer. The adjustments cause and increase in costs.

The conditions for treating the substrate surface and for forming the adhesive layer have been examined and set as described above considering the merits and demerits of the treatment for improving the adhesion and the merits and demerits of interposing the adhesive layer. Surface treatment is effective as far as the resultant carbonyl group concentration in the surface of the polymer resin substrate measured by the X-ray electron spectroscopic analysis is from 0.1 at. % to 30 at. %. Since the magnetic recording medium according to the invention includes a carbon film or such an adhesive layer, it is possible to conduct the plasma irradiation treatment or the ultraviolet ray irradiation treatment under a lower output or for a shorter treatment time as compared with the plasma irradiation treatment or the ultraviolet ray irradiation treatment for the polymer resin substrate, on which a metal layer or such a nonmagnetic undercoating layer is formed directly. Although the adhesiveness between the substrate and the carbon film is stronger as the B/A ratio is larger, the plasma irradiation treatment or the ultraviolet ray irradiation treatment conducted on the polymer resin substrate according to the invention facilitates setting the lower limit of the B/A ratio at 3, which is smaller than the lower B/A ratio limit of 6 for the carbon film on the substrate, the surface thereof is not treated. When a carbon film and such an adhesive layer is interposed, it is necessary to dope hydrogen to the carbon film according to the prior art so that the B/A ratio may be 6. Since it is enough to set the B/A ratio as low as 3 according to the invention, it is not necessary to dope hydrogen which causes film inflation to the adhesive layer.

The conventional materials are used for the nonmagnetic undercoating layer 3, the magnetic layer 4, the protection layer 5, and the liquid lubricant layer 6 of the magnetic recording medium according to the invention. In detail, a TiW film, a Ru film, and a Cr film are used for the undercoating layer 3. Co-containing ferromagnetic alloy films such as a Co—Cr—Pt film and a Co—Cr—Ta film and alloy films such as a Co—Cr—Pt film containing $SiO_2$ and a Co—Cr—Ta film containing $SiO_2$ are used for the magnetic layer 4. A carbon film and a carbon film containing nitrogen are used for the protection layer 5. Fluorine-containing lubricants such as perfluoropolyether lubricants are used for the liquid lubricant layer 6. The nonmagnetic undercoating layer 3, the magnetic layer 4, the protection layer 5, and the liquid lubricant layer 6 are as thick as the respective layers in the conventional magnetic recording media.

Although the invention has been described with reference to FIG. 1, changes and modifications are obvious depending on the purposes, for which the magnetic recording media are used. For example, the magnetic recording medium according to the invention may include an intermediate layer on the undercoating layer. The magnetic recording medium according to the invention may include a blocking layer on the magnetic layer. For example, Ru, Os, and a nitride of any of the 8, 9, 10/VIII group elements such as FeN, CoN and NiN are used for the intermediate layer. Ti, TiW, W, and oxides of Al, Ti, Ag, Cu, Ni, Co, Si, Cr, Fe and W are used for the blocking layer.

The shape of the magnetic recording medium is adjusted to the instrument, which mounts the magnetic recording medium thereon. For example, the magnetic recording medium mounted on a HDD is shaped with a circular plate.

The magnetic recording medium according to the invention completely prevents film inflation from occurring even when the magnetic recording medium is left in a high-temperature and high-humidity environment or in a low-temperature and low-humidity environment.

Now the method of manufacturing the magnetic recording medium according to the invention will be described. The method of manufacturing the magnetic recording medium according to the invention includes the steps of: treating a nonmagnetic substrate to improve the adhesion thereof; forming an adhesive layer on the nonmagnetic substrate, the adhesion thereof having been improved; forming a nonmagnetic undercoating layer on the adhesive layer; forming a magnetic layer above the nonmagnetic undercoating layer; forming a protection layer above the magnetic layer; and forming a liquid lubricant layer on the protection layer.

The polymer resin substrate is obtained, for example, by injection molding any of the polymer resins described above. In the step of treating, the adhesion of the surface of the polymer resin substrate is improved preferably by plasma irradiation or by ultraviolet ray irradiation. For the plasma irradiation treatment, the conventional plasma irradiation apparatus including a vacuum chamber, a plasma generating means including a plasma discharge electrode, a holding means for holding a specimen to be treated in the vacuum chamber, and a means for introducing a plasma discharge gas into the vacuum chamber is used. The plasma irradiation treatment is conducted by making the holding means in the vacuum chamber hold a polymer resin substrate and by exposing the polymer resin substrate to the plasma generated from the plasma generating means. Helium, argon, nitrogen, oxygen and a mixture of these gases are used for the plasma discharge gas. Argon, oxygen, and a mixture of argon and oxygen are preferable for the discharge gas for treating the polymer resin substrate.

For the ultraviolet ray irradiation treatment, the conventional ultraviolet ray irradiation apparatus including a chamber, in which a specimen to be treated is located in an appropriate environment, an ultraviolet lamp in the chamber, a holding means for holding the specimen in the chamber, and a means for producing the appropriate environment in the chamber is used. The ultraviolet ray irradiation treatment is conducted by holding a polymer resin substrate in the chamber and by irradiating an ultraviolet ray to the polymer resin substrate in an appropriate environment and at an appropriate output. The ultraviolet ray irradiation for treating the polymer resin substrate is conducted under the existence of air, argon, nitrogen, oxygen or a mixture of nitrogen and oxygen. The ultraviolet ray irradiation is conducted preferably under the existence of nitrogen, oxygen, or a mixture of argon and oxygen (including air).

The treatment conditions such as a treatment time and an output for improving the adhesion of the polymer resin substrate are selected so that the resultant carbonyl group concentration in the surface of the polymer resin substrate may be from 0.1 at. % to 30 at. %. The treatment time for the plasma irradiation is preferably from 5 to 20 sec. at the output between 0.01 kW and 0.10 kW. The treatment time for the ultraviolet ray irradiation is preferably from 0.5 to 30 min. at the wavelengths of 185 nm and 254 nm.

Since the magnetic recording medium according to the invention is provided with a carbon film and such an adhesive layer, the plasma irradiation treatment or the ultraviolet ray irradiation treatment is conducted for a shorter irradiation time or at a lower output as compared with the plasma irradiation treatment or the ultraviolet ray irradiation treatment for the polymer resin substrate, on which a metal layer or such an undercoating layer is formed directly.

In the next step, an adhesive layer is formed on the polymer resin substrate, the adhesion thereof is improved. The materials described before are used for the adhesive layer. When the adhesive layer is a carbon film, the B/A ratio is preferably 3 or more, more preferably from 3 to 10, and most preferably 3. The adhesive layer is preferably from 0.5 to 10 nm in thickness and more preferably from 1 to 2 nm in thickness. When the adhesive layer is a carbon film, the carbon film is deposited by sputtering, CVD, PVD, and such a deposition method. Ar, Kr, Xe, and a gas mixture of Ar, Kr or Xe and hydrogen are used preferably. For adjusting the B/A ratio at 3, the sputtering gas pressure is preferably 5 mTorr or more, more preferably from 5 mTorr to 70 mTorr, and most preferably 5 mTorr to 50 mTorr.

Although it has been known that the adhesion of the carbon film as an adhesive layer is higher as the B/A ratio thereof is larger, the B/A ratio of the adhesive layer formed on the polymer resin substrate treated by plasma irradiation or by ultraviolet ray irradiation according to the invention may be adjusted at 3, which is lower than the B/A ratio of 6 for the adhesive layer on the polymer resin substrate, the surface thereof is not treated. When a carbon film and such an adhesive layer is interposed, it is necessary to dope hydrogen in the carbon film according to the prior art so that the B/A ratio of the carbon film may be 6. Since the B/A ratio can be adjusted at 3 according to the invention, it is not necessary to dope the carbon film with hydrogen, which causes film inflation.

In the succeeding steps, a laminate structure for obtaining a magnetic recording medium is formed. When the laminate structure is that shown in FIG. 1, a nonmagnetic undercoating layer 3 is coated on an adhesive layer 2, a magnetic layer 4 on the nonmagnetic undercoating layer 3, and a protection layer 5 on the magnetic layer 4. Then, a lubricant dissolved in a solvent is coated on the protection layer 5. Preferably, the nonmagnetic undercoating layer 3 is a TiW layer and the magnetic layer 4 is a Co—Cr—Pt alloy layer containing $SiO_2$. When the protection layer 5 is a carbon protection layer, the usual carbon protection layer containing graphite as the main component thereof or a DLC protection layer is used. The liquid lubricant layer is made, preferably, of a perfluoropolyether lubricant and such a fluorine lubricant.

A TiW layer for the nonmagnetic undercoating layer 3, a Co—Cr—Pt alloy layer containing $SiO_2$ for the magnetic layer 4, and a carbon layer for the protection layer 5 are deposited by sputtering. The liquid lubricant layer is coated by dip-coating or by spin-coating.

The nonmagnetic undercoating layer 3, the magnetic layer 4, the protection layer 5, and the liquid lubricant layer 6 are as thick as the respective layers in the conventional magnetic recording media.

As described before, the magnetic recording medium according to the invention may include an intermediate layer on the undercoating layer. The magnetic recording medium according to the invention may include a blocking layer on the magnetic layer. For example, Ru, Os, and a nitride of any of the 8, 9, 10/VIII group elements such as FeN, CoN and NiN are used for the intermediate layer. Ti, TiW, W, and oxides of Al, Ti, Ag, Cu, Ni, Co, Si, Cr, Fe and W are used for the blocking layer. The intermediate layer and the blocking layer are deposited by sputtering, CVD, and PVD.

The magnetic storage according to the invention includes the magnetic recording medium formed as described above. The magnetic storage according to the invention is a hard disk drive and such a recording apparatus for an external storage of a computer. The magnetic storage according to the invention is used in image processing apparatuses such as a videotape recorder and a cash memory. The magnetic storage according to the invention is used in image storage apparatuses including the image processing units and the recording units of household appliances (such as TV-sets, digital cameras and portable telephone sets).

Now the invention will be described in more detail in connection with the preferred embodiments thereof.

Manufacture of Magnetic Recording Media

The surfaces of polymer resin substrates made of polyolefin (ZEONEX supplied from Nippon Zeon Co., Ltd.) are treated by plasma irradiation or by ultraviolet ray irradiation under the conditions described below in connection with the first through third embodiments. A carbon adhesive layer is formed by sputtering on any of the substrates. The B/A ratios and the sputtering gas pressures are described below in connection with the first through third embodiments. The sputtering gases contain the following gas species: argon (100%) for the B/A ratio of 3, argon and hydrogen (25%) for the B/A ratio of 6.5, and argon and hydrogen (50%) for the B/A ratio of 9. Then, a TiW undercoating layer is formed by sputtering on the carbon protection layer. A Ru intermediate layer is formed by sputtering on the TiW undercoating layer. A Co—Cr—Pt magnetic layer containing SiO2 is formed by sputtering on the Ru intermediate layer. A Ti blocking layer is formed by sputtering on the magnetic layer. And, a carbon protection layer containing nitrogen is formed by sputtering on the blocking layer. Finally, a perfluoropolyether lubricant is coated on the protection layer by spin-coating.

Environmental Tests and Evaluation of Film Inflation

The magnetic recording media obtained as described above are stored for 96 hr. in a constant temperature oven kept at 80° C. and 80% (relative humidity). Then, the temperature and the humidity of the oven storing the magnetic recording media are lowered to −40° C. and 0%, respectively. The magnetic recording media are stored at −40° C. and 0% for 8 hours. Then, the temperature and the humidity of the oven are changed to 25° C. and 25%, respectively. Then, the magnetic recording media are taken out from the oven. Then, the surfaces of the magnetic recording media are observed under an optical microscope to find whether film inflation is caused or not.

First Embodiment

For examining the conditions, under which any film inflation is not caused, the B/A ratio and the thickness of the adhesive layers according to a first embodiment of the invention are fixed at 3 and 1 nm, respectively, and the plasma irradiation output is changed from 0.01 kW to 0.10 kW. For comparison, a comparative magnetic recording medium including a substrate, the surface thereof is not treated, and no carbon film (adhesive layer) is tested. Table 1 lists the results.

TABLE 1

| | Plasma irradiation | | Carboxylic acid (at. %) | Carbon adhesive layer | | |
|---|---|---|---|---|---|---|
| Specimens | Output (kW) | Discharge gases | | B/A ratios | Gas pressures (mTorr) | Film inflation |
| Comparative | 0.00 | Ar | 0 | — | — | Caused |
| 1 | 0.01 | Ar | 0.1 | 3 | 50 | Non |
| 2 | 0.03 | Ar | 1.0 | 3 | 50 | Non |
| 3 | 0.05 | Ar | 2.5 | 3 | 50 | Non |
| 4 | 0.07 | Ar | 6.5 | 3 | 50 | Non |
| 5 | 0.10 | Ar | 9.0 | 3 | 50 | Non |
| 6 | 0.07 | Ar + O$_2$ | 11.3 | 3 | 50 | Non |

The carboxylic acid concentration changes from 0.1 at. % to 11.3 at. % as the plasma output is changed from 0.01 kW to 0.10 kW. In the range of the carboxylic acid concentration described above, any film inflation is not caused. Since it has been known that the surface of the polymer resin substrate is roughened and the electromagnetic conversion characteristics are impaired when the plasma output is more than 0.10 kW, the plasma output of more than 0.10 kW is not employed.

Second Embodiment

For examining the conditions, under which any film inflation is not caused, the B/A ratio and the thickness of the adhesive layers according to a second embodiment of the invention are fixed at 3 and 1 nm, respectively. An ultraviolet lamp, the wavelengths thereof are 185 nm and 254 nm, is used, and the irradiation time is changed from 0.5 min to 30 min. Table 2 lists the results.

TABLE 2

| | UV irradiation | | Carboxylic acid (at. %) | Carbon adhesive layer | | |
|---|---|---|---|---|---|---|
| Specimens | Atmospheres | Time (min) | | B/A ratios | Gas pressures (mTorr) | Film inflation |
| 1 | Air | 0.5 | 0.7 | 3 | 50 | Non |
| 2 | Air | 3 | 4.5 | 3 | 50 | Non |
| 3 | Air | 5 | 10.6 | 3 | 50 | Non |
| 4 | Air | 10 | 15.0 | 3 | 50 | Non |
| 5 | Air | 30 | 24.6 | 3 | 50 | Non |
| 6 | N$_2$ | 3 | 1.6 | 3 | 50 | Non |
| 7 | O$_2$ | 3 | 10.9 | 3 | 50 | Non |

The carboxylic acid concentration changes from 0.7 at. % to 24.6 at. % as the ultraviolet ray irradiation time is changed from 0.5 min. to 30 min. In the range of the carboxylic acid concentration described above, any film inflation is not caused. Although any film inflation is not caused by the ultraviolet ray irradiated for 30 min., the substrate surface is roughened.

Third Embodiment

For examining the conditions, under which any film inflation is not caused, the plasma irradiation output is fixed at 0.01 kW, the thickness of the carbon adhesive layer is fixed at 1 nm, the B/A ratio of the carbon adhesive layer is changed from 3 to 9, and the sputtering gas pressure for depositing the carbon adhesive layer is changed from 2 mTorr to 70 m Torr. Table 3 lists the results.

TABLE 3

| | Plasma irradiation | | Carboxylic acid (at. %) | Carbon adhesive layer | | |
|---|---|---|---|---|---|---|
| Specimens | Output (kW) | Discharge gas | | B/A ratios | Gas pressures (mTorr) | Film inflation |
| 1 | 0.01 | Ar | 0.1 | 3 | 2 | Caused |
| 2 | 0.01 | Ar | 0.1 | 3 | 5 | Non |
| 3 | 0.01 | Ar | 0.1 | 3 | 20 | Non |
| 4 | 0.01 | Ar | 0.1 | 3 | 50 | Non |
| 5 | 0.01 | Ar | 0.1 | 3 | 70 | Non |
| 6 | 0.01 | Ar | 0.1 | 6.5 | 50 | Non |
| 7 | 0.01 | Ar | 0.1 | 9 | 50 | Non |

As Table 3 indicates, any film inflation is not caused except for the sputtering gas pressure of 2 mTorr for forming the carbon adhesive layer. When the B/A ratio is 3, it is preferable for the sputtering gas pressure to be 5 mTorr or higher.

As the results of the first through third embodiments indicate, it is not necessary to irradiate plasma at a high output and it is possible to shorten the ultraviolet ray irradiation time. As the results described above indicate, the carboxylic acid concentration in the surface of the polymer resin substrate is preferably from 0.1 at. % to 30 at. %. Therefore, the surface treatment conditions by plasma irradiation or by ultraviolet ray irradiation conditions are set so that the resultant carboxylic acid concentration in the surface of the polymer resin substrate may be within the above described range.

Since the magnetic recording medium according to the invention includes an adhesive layer on the polymer resin substrate, the surface treatment by plasma irradiation or by ultraviolet ray irradiation is conducted at a lower irradiation output or for a shorter irradiation time as compared with the surface treatment of the polymer resin substrate, on which any adhesive layer is not formed.

Although the adhesiveness between the substrate and the carbon film is stronger as the B/A ratio is larger, the plasma irradiation treatment or the ultraviolet ray irradiation treatment conducted on the polymer resin substrate according to the invention facilitates setting the lower limit of the B/A ratio at 3, which is smaller than the lower B/A ratio limit of 6 for the carbon film on the substrate, the surface thereof is not treated. When a carbon film and such an adhesive layer is interposed, it is necessary to dope hydrogen to the carbon film according to the prior art so that the B/A ratio may be 6. Since it is enough to set the B/A ratio as low as 3 according to the invention, it is not necessary to dope hydrogen which causes film inflation to the adhesive layer.

According to the invention, a magnetic recording medium which does not cause any film inflation under the sever environments, under which household appliances are used, is obtained by improving the adhesion of the polymer resin substrate by plasma irradiation or by ultraviolet ray irradiation and by depositing a carbon adhesive layer, the B/A ratio thereof is low, at a relatively low gas pressure.

Since the substrate surface is activated by the treatment which improves the adhesion of the substrate by the manufacturing method according to the invention, it becomes unnecessary to interpose an adhesive layer exhibiting high adhesion. For example, a carbon film, the B/A ratio thereof is low (that is, containing no hydrogen), is employed for the adhesive layer with no problem. The interposition of the adhesive layer facilitates conducting the treatment for improving the adhesion of the surface of the polymer resin substrate under mild conditions. Therefore, water hardly aggregates on the boundary between the polymer resin substrate and the adhesive layer or on the boundary between the adhesive layer and the magnetic layer. Moreover, a polymer resin substrate containing less degradation products of the resin and less hydrocarbon components, which cause film inflation, is obtained. As the results, a magnetic recording medium, which hardly causes film inflation, is obtained according to the invention.

What is claimed is:

1. The method of manufacturing a magnetic recording medium including a nonmagnetic substrate made of a polymer resin; an adhesive layer on the nonmagnetic substrate: a nonmagnetic undercoating layer above the adhesive layer; a magnetic layer above the nonmagnetic undercoating layer; a protection layer above the magnetic layer; and a liquid lubricant layer on the protection layer, the method comprising the steps of:

irradiating a surface of the nonmagnetic substrate with plasma or ultraviolet ray so that carbony group concentration formed in the surface of the nonmagnetic substrate measured by X-ray photoelectron spectroscopic analysis is limited to 0.1 at. % to 30 at. % after the plasma or ultraviolet ray irradiatin to improve an adhesion characteristic thereof; and lower the B/A ratio of the adhesive layer, as measured by the Raman spectroscopic analysis, to 3 or higher;

forming a carbon film as the adhesive layer on the nonmagnetic substrate;

forming the nonmagnetic undercoating layer above the adhesive layer;

forming the magnetic layer above the nonmagnetic undercoating layer;

forming the protection layer above the magnetic layer; and forming the liquid lubricant layer on the protection layer.

2. The method according to claim 1, wherein the treatment includes plasma irradiation uses argon, oxygen or a mixture of argon and oxygen for the plasma discharge gas.

3. The method according to claim 1, wherein the ultraviolet ray irradiation is conducted under the existence of nitrogen, oxygen, or mixture of nitrogen and oxygen.

4. The method according to claim 1, wherein the adhesive layer is formed by sputtering under the sputtering gas pressure of 5 mTorr or higher.

5. The method according to claim 1, wherein the carbon film is formed without doping hydrogen thereinto.

* * * * *